United States Patent
Horita et al.

(10) Patent No.: US 10,514,080 B2
(45) Date of Patent: Dec. 24, 2019

(54) TORSIONAL VIBRATION REDUCING DEVICE

(71) Applicant: TOYOTA JIDOSHA KABUSHIKI KAISHA, Toyota-shi (JP)

(72) Inventors: Shuhei Horita, Numazu (JP); Hiroyuki Amano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 219 days.

(21) Appl. No.: 15/433,490

(22) Filed: Feb. 15, 2017

(65) Prior Publication Data

US 2017/0234401 A1    Aug. 17, 2017

(30) Foreign Application Priority Data

Feb. 16, 2016   (JP) ................................. 2016-026845

(51) Int. Cl.
*F16F 15/14*   (2006.01)

(52) U.S. Cl.
CPC ................................. *F16F 15/145* (2013.01)

(58) Field of Classification Search
CPC ...... F16F 15/145; F16F 15/1407; F16F 15/24; F16F 15/283; F16F 15/14
USPC ............................................................ 74/604
See application file for complete search history.

(56) References Cited

U.S. PATENT DOCUMENTS

| 1,315,380 | A | * | 9/1919 | Martens ................... F16F 15/14 |
| | | | | 74/604 |
| 5,976,020 | A | | 11/1999 | Lohaus et al. |
| 6,067,876 | A | * | 5/2000 | Lohaus ................. F16F 15/145 |
| | | | | 74/574.4 |
| 2014/0352290 | A1 | * | 12/2014 | Horita ................... F16F 15/145 |
| | | | | 60/330 |

FOREIGN PATENT DOCUMENTS

| DE | 10 2010 052 388 A1 | 6/2011 |
| DE | 102014224164 A1 | 7/2015 |
| DE | 10 2015 203 046 A1 | 8/2015 |
| GB | 2 318 169 A | 4/1998 |
| JP | 10-231895 | 9/1998 |
| JP | 10-231895 A | 9/1998 |
| JP | 2012-077827 A | 4/2012 |

* cited by examiner

*Primary Examiner* — Thomas C Diaz
(74) *Attorney, Agent, or Firm* — Oblon, McClelland, Maier & Neustadt, L.L.P.

(57) ABSTRACT

A torsional vibration reducing device includes: a rotating body; an inertial body; a coupling member configured to transmit the torque to the rotating body and to the inertial body; and a first coupling portion and a second coupling portion, which are separately provided to either the rotating body or the inertial body. The first coupling portion engages with the coupling member so as to: restrict movement of the coupling member in a rotational direction of the rotating body; and allow movement of the coupling member in a radial direction of the rotating body. The second coupling portion engages with the coupling member such that when the rotating body and the inertial body rotate relative to each other, a contact portion of the coupling member with respect to the first coupling portion moves in the radial direction of the rotating body.

5 Claims, 21 Drawing Sheets

TORSIONAL VIBRATION REDUCING DEVICE

INCORPORATION BY REFERENCE

The disclosure of Japanese Patent Application No. 2016-026845 filed on Feb. 16, 2016 including the specification, drawings and abstract is incorporated herein by reference in its entirety.

BACKGROUND

1. Technical Field

The disclosure relates to a torsional vibration reducing device that reduces torsional vibration due to input torque fluctuation.

2. Description of Related Art

An example of this type of device is described in Japanese Patent Application Publication No. 2012-77827. This device includes an annular support member connected to a power source, a plurality of guide holes formed at regular intervals in a circumferential direction of the support member, and a plurality of mass bodies respectively disposed in the guide holes. When the support member rotates, the mass bodies disposed in the guide holes also rotate so that each mass body is pressed against an inner wall surface, on an outer side in a radial direction of the support member, of the guide hole by a centrifugal force. When the torque fluctuates in the state where the mass bodies are pressed against the inner wall surfaces on the radially outer side by the centrifugal force, the mass bodies reciprocate along the inner wall surfaces on the radially outer side. Inertial forces of those mass bodies act in a direction of suppressing torsional vibration due to the torque fluctuation so that the torsional vibration is reduced.

SUMMARY

In a device that reduces torsional vibration due to torque fluctuation by a reciprocating motion of a mass body, the greater the mass of the mass body, the more the damping performance for low-frequency vibration is improved. As a method for improving the damping performance for low-frequency vibration in the configuration described in JP 2012-77827 A, it may be considered to increase the number of the mass bodies, thereby increasing the mass of the mass bodies of the device as a Whole. However, in a case where the number of the guide holes formed in the circumferential direction of the support member is increased, spaces between the adjacent guide holes become too narrow or the size of each guide hole is limited, and therefore, it is difficult to increase the total number of the mass bodies and thus there is still room for improvement in terms of improving the vibration damping performance by increasing the mass of the mass bodies of the device as a whole.

The disclosure provides a torsional vibration reducing device that improves the damping performance for low-frequency vibration by increasing the mass of a mass body which makes a reciprocating motion or a pendulum motion, and at the same time, that suppresses an increase in the size of the device.

According to one aspect of the disclosure, a torsional vibration reducing device is provided. The torsional vibration reducing device includes: a rotating body configured to rotate when torque is input to the rotating body; an inertial body configured to rotate relative to the rotating body so as to suppress torsional vibration of the rotating body when the torque fluctuates; a coupling member configured to transmit the torque to the rotating body and to the inertial body; a first coupling portion provided to one of the rotating body and the inertial body, the first coupling portion engaging with the coupling member such that the first coupling portion restricts movement of the coupling member in a rotational direction of the rotating body and allows movement of the coupling member in a radial direction of the rotating body; and a second coupling portion provided to another one of the rotating body and the inertial body, the second coupling portion engaging with the coupling member such that when the rotating body and the inertial body rotate relative to each other, a contact portion of the coupling member with respect to the first coupling portion moves in the radial direction of the rotating body.

According to the above mentioned aspect, the first coupling portion may extend in the radial direction of the rotating body, and the first coupling portion may include a guide groove portion. The guide groove portion may sandwich the coupling member so as to guide the coupling member in the radial direction of the rotating body.

According to the above mentioned aspect, the coupling member may include a member that has a circular shape in cross section, and may be disposed in parallel to a rotation center axis of the rotating body. The second coupling portion may include a circular arc surface. The member may receive a centrifugal force so as to be pressed against the circular arc surface when the rotating body rotates. The circular arc surface may have a curvature radius that is smaller than a curvature radius of an outer shape of the inertial body. The curvature radius of the circular arc surface may center at a portion that is offset from a rotation center of the inertial body.

According to the above mentioned aspect, the coupling member may include: a centrifugal mass that is guided by the guide groove portion in the radial direction of the rotating body; at least a pair of first hole portions that are disposed in the centrifugal mass side by side in a circumferential direction of the rotating body; and pins that are disposed in the first hole portions, and configured to move in the first hole portions. The second coupling portion may include second hole portions, and the pins may be disposed in the second hole portions.

According to the above mentioned aspect, the coupling member may include a hollow member of an annular shape in cross section. The hollow member may be guided by the guide groove portion in the radial direction of the rotating body. The second coupling portion may include a support pin having an outer diameter smaller than an inner diameter of the hollow member and being disposed in the hollow member.

According to the above mentioned aspect, a surface, that contacts the guide groove portion, of the coupling member may be a curved surface. The coupling member may be a swing body that rotates about a portion offset from a center of curvature of the curved surface. The second coupling portion may include a coupling pin that is fitted to the swing body so as to rotate at a rotation center of the swing body, According to the disclosure, the rotating body and the inertial body are coupled to each other via the coupling member such that the torque can be transmitted therebetween. When the torque of the rotating body fluctuates, the inertial body rotates relative to the rotating body by its own inertial force. The coupling member is coupled to the rotating body or the inertial body by the first coupling portion. In the first coupling portion, the coupling member is movable in the radial direction of the rotating body such that, for example, when a centrifugal force is applied, the coupling member moves outward in the radial direction of the rotating body. On the other hand, the coupling member is restricted in the rotational direction of the rotating body by the first coupling portion such that the torque is transmitted between the first coupling portion and the coupling member. The coupling member engages with the second coupling portion. The second coupling portion is configured such that when the rotating body and the inertial body rotate relative to each other due to torque fluctuation, a contact portion of the coupling member with respect to the first coupling portion moves in the radial direction of the rotating body. As a result, an acting portion of torque generated between the rotating body and the inertial body based on the inertia of the inertial body changes in the radial direction of the rotating body. Since such a change repeatedly occurs due to periodic torque changes, i.e. torque vibration, it is possible to effectively suppress torque fluctuation and torsional vibration due to the torque fluctuation. In the disclosure, the member directly attached to or engaged with the rotating body is a coupling member, and the inertial body for reducing vibration is disposed adjacent to the rotating body. Therefore, the arrangement and size of the inertial body are not restricted by the size, shape, and so on of the rotating body. Consequently, it is possible to increase the mass of the inertial body without increasing the size of the rotating body.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
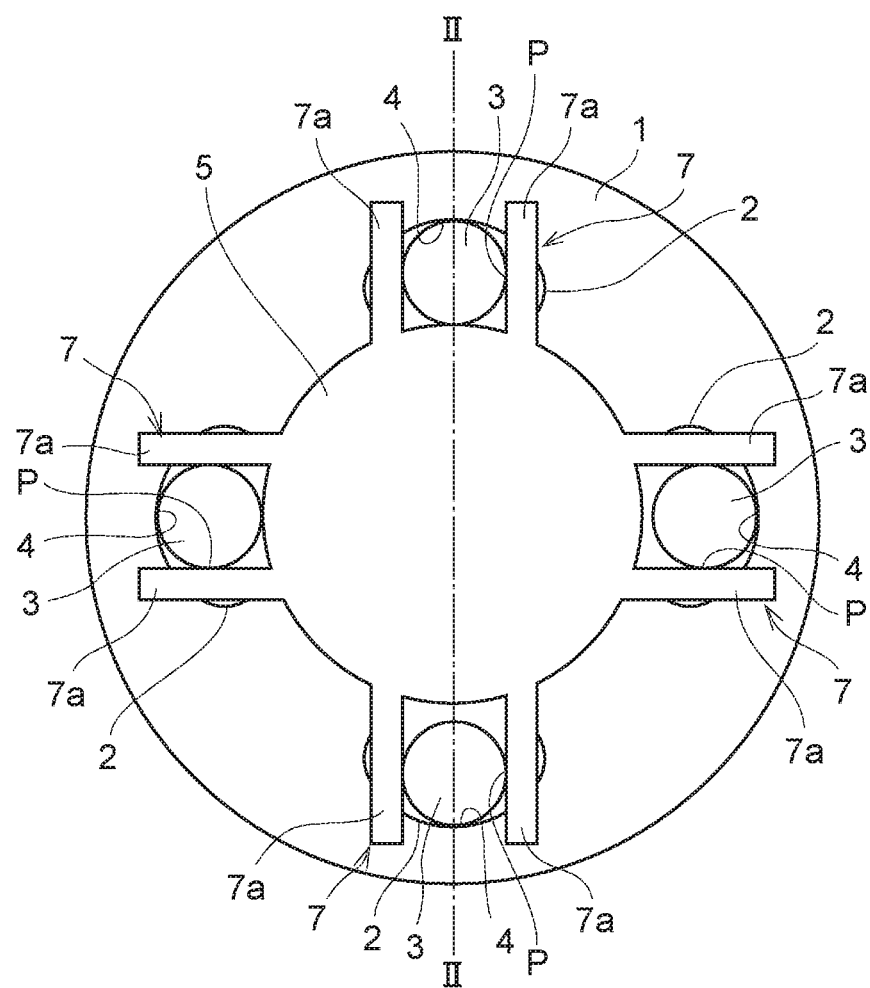
FIG. 1 is a front view exemplarily showing a first example of a torsional vibration reducing device according to an embodiment of the disclosure.
Figure 2:
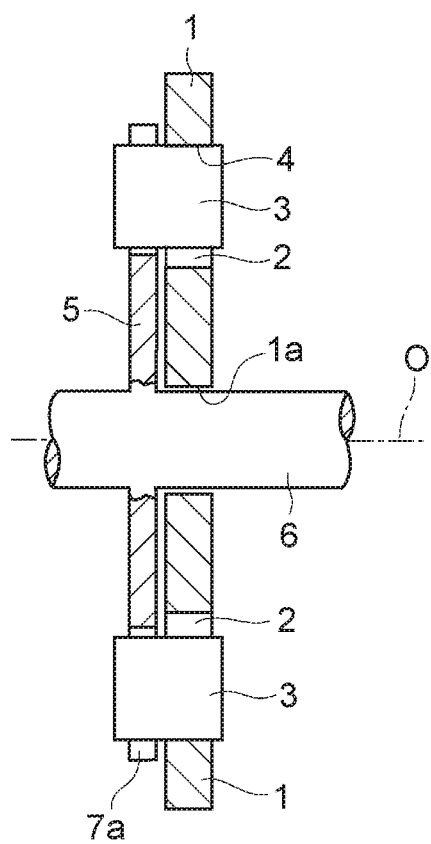
FIG. 2 is a sectional view taken along line II-II of FIG. 1.

Next, the disclosure will be described with reference to an embodiment. A torsional vibration reducing device according to an embodiment of the disclosure is configured to rotate an inertial body relative to a rotating body according to torque fluctuation, thereby reducing or suppressing torsional vibration of the rotating body due to the torque fluctuation. FIG. 1 is a front view exemplarily showing a first example of a torsional vibration reducing device according to an embodiment of the disclosure, and FIG. 2 is a sectional view taken along line II-II of FIG. 1. In the example shown here, an inertial body 1 is an annular plate, and a later-described rotary shaft 6 passes through a hole 1a formed at the center of the inertial body 1. Guide holes 2 are formed in the inertial body 1 at regular intervals on the circumference of a circle at positions of the same radius from the rotation center O of the inertial body 1. The guide holes 2 are formed to pass through the inertial body 1 in a thickness direction thereof, and a rolling body 3 corresponding to a coupling member of the disclosure is disposed in each guide hole 2. The guide hole 2 has a suitable shape and size that allow the rolling body 3 disposed therein to reciprocate in a predetermined range. The shape of the guide hole 2 may be an oval shape shown in FIG. 1 or a simple circular shape. Although FIG. 1 shows the example in which the four guide holes 2 are formed at the positions that are point-symmetrical with respect to the rotation center O, at least two guide holes 2 may be formed at positions that are point-symmetrical with respect to the rotation center O. In short, it is satisfactory that the position of the center of gravity of each rolling body 3 substantially coincides with the rotation center O or with an axis passing through the rotation center O.

An inner wall surface, on an outer side in a radial direction of the inertial body 1, of the guide hole 2 serves as a rolling surface 4 against which the rolling body 3 is pressed by a centrifugal force and along which the rolling body 3 reciprocates due to torque fluctuation. In this state, the shape of the rolling surface 4 is a circular arc surface with a radius of curvature smaller than a radius of the outer shape of the inertial body 1 or a curved surface approximate to the circular arc surface. A portion where the rolling body 3 is pressed against the rolling surface 4 by the centrifugal force serves as a torque transmission portion therebetween, and the torque transmission portion moves along the rolling surface 4, i.e. changes in the radial direction, according to torque fluctuation as will be described later. Inner wall surfaces on both sides in a circumferential direction continuous with the rolling surface 4 serve as boundary surfaces defining the guide hole 2, and the rolling body 3 is configured to roll while being limited by the boundary surfaces or to roll between the boundary surfaces. The shape of the rolling body 3 will be described later. The guide hole 2/the rolling surface 4 corresponds to a second coupling portion of the disclosure.

In the example shown in FIG. 1, the rolling body 3 is formed in a cylindrical shape so as to be able to roll along the rolling surface 4 and has an axial length greater than a thickness of the inertial body 1. Therefore, as shown in FIG. 2, both end portions of the rolling body 3 protrude in the axial direction from the guide hole 2.

The rotating body 5 is disposed coaxially with the inertial body 1 and adjacent to the inertial body 1 in the axial direction of the inertial body 1. The rotating body 5 is formed in a disk shape. The rotating body 5 has a diameter that is designed to be smaller than a distance between points, closest to the rotation center O, on outer peripheral surfaces of the two rolling bodies 3, located at positions that are point-symmetrical with respect to the rotation center O, among the rolling bodies 3 being pressed against the rolling surfaces 4 by the centrifugal force. The rotating body 5 is coupled to a drive power source via the rotary shaft 6 passing through the hole 1a of the inertial body 1.

Guide groove portions 7 are respectively provided at positions, corresponding to the guide holes 2, on an outer peripheral surface of the rotating body 5 so as to extend radially outward from the outer peripheral surface of the rotating body 5. Each guide groove portion 7 includes a pair of groove wall portions 7a extending radially outward, and the interval between the groove wall portions 7a is designed to be approximately equal to or slightly greater than an outer diameter of the rolling body 3. An end portion on a radially outer side of each groove wall portion 7a is located radially inward of the outer peripheral edge of the inertial body 1. As shown in FIG. 2, one axial end side of the rolling body 3 in the axial direction is disposed in each guide groove portion 7. In this way, the rolling body 3 is restricted by the guide groove portion 7 so as to move integrally with the guide groove portion 7 in a rotational direction of the inertial body 1. On the other hand, since the guide groove portion 7 is opened in the radial direction, the rolling body 3 is configured to be movable in the radial direction while being limited to the inside of the guide hole 2. A contact portion P between each of the groove wall portions 7a and the outer peripheral surface of one end portion in the axial direction of the rolling body 3 serves as a torque transmission portion therebetween, and the contact portion P changes in the radial direction according to torque fluctuation as will be described later. The guide groove portion 7 corresponds to a first coupling portion of the disclosure.

Next, the operation of the torsional vibration reducing device configured as described above will be described.

When the torque is transmitted to the rotary shaft 6, the rotating body 5 rotates. Since the rolling bodies 3 are coupled to the rotating body 5 via the guide groove portions 7, the rolling bodies 3 rotate together with the rotating body 5 so that a centrifugal force is applied to the rolling bodies 3. When the centrifugal force is large enough, the rolling bodies 3 move radially outward in the guide groove portions 7. Then, the rolling bodies 3 each move to a portion, farthest from the rotation center O of the inertial body 1, of the rolling surface 4 so as to be pressed against the rolling surfaces 4. When the torque transmitted to the rotary shaft 6 does not fluctuate or fluctuates only slightly in the state where the rolling bodies 3 are pressed against the rolling surfaces 4 as described above, the entire torsional vibration reducing device configured as described above rotates as one unit.

When the torque input to the rotary shaft 6 fluctuates, vibration occurs in the rotation of the rotating body 5 so that vibration occurs in the rotation of the rolling bodies 3. Then, the rolling bodies 3 and the inertial body 1 rotate relative to each other by a predetermined angle so that the rolling bodies 3 roll along the rolling surfaces 4. Since the rolling surface 4 is the curved surface with the radius of curvature smaller than the radius of the outer shape of the inertial body 1, the position of the rolling body 3 in the radial direction of the rotating body 5 changes in the radial direction of the rotating body 5 along the rolling surface 4. Consequently, the position of the rolling body 3 in the guide groove portion 7 changes in the radial direction of the rotating body 5. Specifically, the contact portions P between the guide groove portions 7 and the rolling bodies 3. i.e. the portions where the inertia torque of the inertial body 1 is applied to the rotating body 5, move in the radial direction of the rotating body 5. Such a change repeatedly occurs due to torque fluctuation. Accordingly, it is possible to effectively suppress torque fluctuation and torsional vibration due to the torque fluctuation.

A description will be given of a case where it is configured that the torsional vibration reducing device configured as described above is immersed in oil or that oil is forcibly or indirectly supplied to the rolling bodies 3 or the rolling surfaces 4. In the device configured as described above, fluctuation occurs in the rotation of the inertial body 1 according to input torque fluctuation. Since the inertial body 1 is the annular plate as described above, the oil is mainly subjected to a shearing action due to fluctuation of positions in the rotational direction of the inertial body 1. That is, since the fluctuation of positions in the rotational direction of the inertial body 1 is not easily impeded by the resistance of the oil, it is possible to prevent or suppress degradation of the vibration damping performance due to the resistance of the oil.

Figure 3:
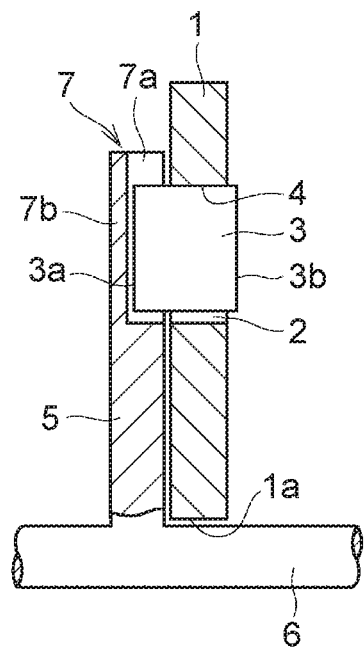
FIG. 3 is a diagram for explaining another example of a connection structure between an inertial body and a rotating body via a rolling body.

Herein, a description will be given of another example of a connection structure between an inertial body 1 and a rotating body 5 via rolling bodies 3. FIG. 3 shows this example. In the example shown here, the side, opposite to the inertial body 1 in an axial direction, of each of guide groove portions 7 is closed. The rotating body 5 is a disk-shaped plate and has an outer diameter slightly smaller than an outer diameter of the inertial body 1. On a surface, on the inertial body 1 side, of the rotating body 5, the guide groove portion 7 in the form of a recess with a short length measured in the axial direction is formed at each of positions corresponding to the rolling bodies 3 that are pressed against rolling surfaces 4 by a centrifugal force. The guide groove portion 7 is opened radially outward, and its groove width in a circumferential direction is designed to be approximately equal to or slightly greater than a diameter of the rolling body 3. Wall surfaces on both sides, in the circumferential direction of the rotating body 5, of the guide groove portion 7 are groove wall portions 7a. A wall surface, in the axial direction of the rotating body 5, of the guide groove portion 7 is a cover portion 7b. One axial end 3a side of the rolling body 3 in the axial direction is disposed in the guide groove portion 7. Since the other configurations are the same as those shown in FIGS. 1 and 2, the same symbols are assigned to portions that are the same as those shown in FIGS. 1 and 2, thereby omitting description thereof.

Next, the operation of the torsional vibration reducing device configured as shown in FIG. 3 will be described. When the rolling body 3 moves from the inertial body 1 side to the rotating body 5 side in the axial direction, the one axial end 3a of the rolling body 3 comes into contact with the cover portion 7b of the guide groove portion 7. Therefore, it is possible to prevent corning-off of the rolling body 3 from a guide hole 2 to the rotating body 5 side. Even with the configuration shown in FIG. 3, the same action and effect as in the configuration shown in FIG. 1 can be obtained by the same principle as in the configuration shown in FIG. 1.

Figure 4:
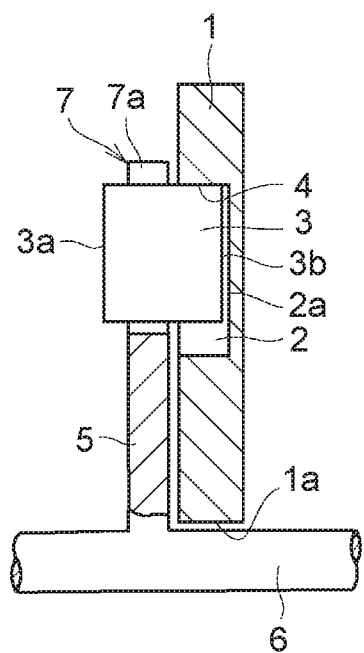
FIG. 4 is a diagram for explaining still another example of a connection structure between an inertial body and a rotating body via a rolling body.

FIG. 4 is a diagram for explaining still another example of a connection structure between an inertial body 1 and a rotating body 5 via rolling bodies 3. In the example shown here, the side, opposite to the rotating body 5 in an axial direction, of each of guide holes 2 is closed. On a surface, on the rotating body 5 side, of the inertial body 1, the guide holes 2 each in the form of a recess with a short length measured in the axial direction are formed at regular intervals on the circumference of a circle at positions of the same radius from the rotation center O of the inertial body 1. An inner wall surface, on an outer side in a radial direction, of the guide hole 2 serves as a rolling surface 4 described above. An inner wall surface, in the axial direction, of the guide hole 2 is a bottom portion 2a. The other axial end 3b side of the rolling body 3 in the axial direction is disposed in the guide hole 2. As described above, the guide hole 2 has a suitable shape and size that allow the rolling body 3 disposed therein to reciprocate in a predetermined range. The shape of the guide hole 2 may be a so-called oval shape shown in FIG. 1 or a simple circular shape. Since the other configurations are the same as those shown in FIGS. 1 and 2, the same symbols are assigned to portions that are the same as those shown in FIGS. 1 and 2 thereby omitting description thereof.

In the example shown in FIG. 4, when the rolling body 3 moves from the rotating body 5 side to the inertial body 1 side in the axial direction, the other axial end 3b of the rolling body 3 comes into contact with the bottom portion 2a of the guide hole 2. Therefore, it is possible to prevent coming-off of the rolling body 3 from the guide hole 2 to the side opposite to the rotating body 5. Further, compared to the configuration shown in FIG. 2 or FIG. 3, the mass of the inertial body 1 can be increased by the mass of the bottom portions 2a. Since the inertia torque of the inertial body 1 can be increased accordingly, the vibration damping performance can be improved.

Figure 5:
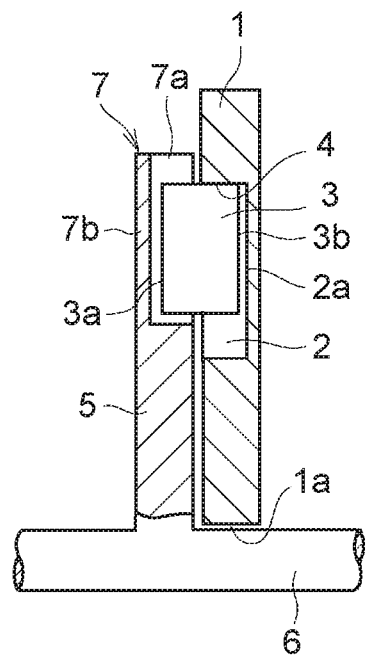
FIG. 5 is a diagram for explaining still another example of a connection structure between an inertial body and a rotating body via a rolling body.

FIG. 5 is a diagram for explaining still another example of a connection structure between an inertial body 1 and a rotating body 5 via rolling bodies 3. In the example shown in FIG. 5, the rotating body 5 is configured as shown in FIG. 3, while the inertial body 1 is configured as shown in FIG. 4.

In the example shown in FIG. 5, when the rolling body 3 moves from the inertial body 1 side to the rotating body 5 side in an axial direction, one axial end 3a of the rolling body 3 comes into contact with a cover portion 7b of a guide groove portion 7. When the rolling body 3 moves from the rotating body 5 side to the inertial body 1 side in the axial direction, the other axial end 3b of the rolling body 3 comes into contact with a bottom portion 2a of a guide hole 2. Therefore, it is possible to prevent or suppress coming-off of the rolling body 3 in the axial direction of the torsional vibration reducing device in the embodiment of the disclosure. Further, compared to the configuration shown in FIG. 2 or FIG. 3, the mass of the inertial body 1 can be increased by the mass of the bottom portions 2a to increase the inertia torque of the inertial body 1 so that the vibration damping performance can be improved.

Figure 6:
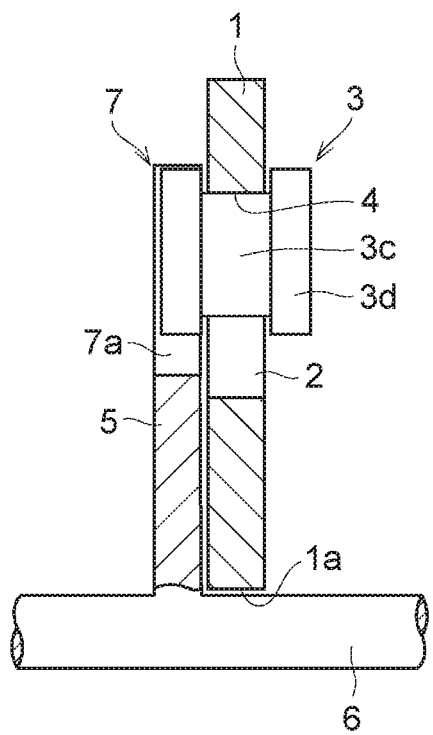
FIG. 6 is a diagram for explaining another example of the shape of a rolling body.

A description will be given of another example of the shape of a rolling body 3. FIG. 6 shows this example. In the example shown in FIG. 6, the rolling body 3 includes a cylindrical shaft portion 3c and flange portions 3d respectively provided on both sides in an axial direction of the shaft portion 3c and has a sectional shape of "H". The flange portions 3d that are located on the rotating body 5 side of the rolling body 3 in the axial direction is disposed in a guide groove portion 7 of the rotating body 5. A contact portion between each of groove wall portions 7a and an outer peripheral surface of the one flange portion 3d serves as a contact portion P described above. FIG. 6 shows the guide groove portion 7 configured the same as the guide groove portion 7 shown in FIG. 1, but instead, the guide groove portion 7 configured as shown in FIG. 3 may be provided to the rotating body 5. In either of the configurations, the groove width of the guide groove portion 7 in a rotational direction of the rotating body 5 is designed to be approximately equal to or slightly greater than an outer diameter of the flange portion 3d. Since the other configurations are the same as those shown in FIGS. 1 and 2, the same symbols are assigned to portions that are the same as those shown in FIGS. 1 and 2, thereby omitting description thereof.

With this configuration, when the rolling body 3 moves in the axial direction, the flange portions 3d engage with both side surfaces of an inertial body 1 so that it is possible to prevent coming-off of the rolling body 3 from a guide hole 2 in the axial direction. Even with the configuration shown in FIG. 6, the same action and effect as in the configuration shown in FIG. 1 can be obtained by the same principle as in the configuration shown in FIG. 1.

Figure 7:
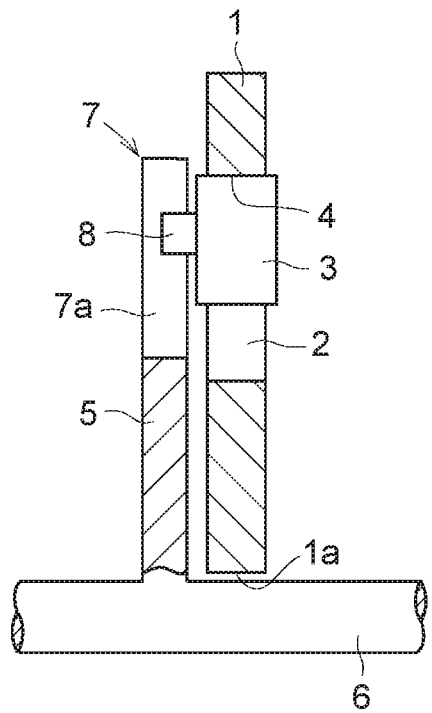
FIG. 7 is a diagram for explaining still another example of the shape of a rolling body.

FIG. 7 is a diagram for explaining still another example of the shape of a rolling body 3. In the example shown in FIG. 7, the rolling body 3 is formed in a cylindrical shape and is integrally formed with an engaging projection 8 at one axial end 3a thereof in an axial direction on the rotating body 5 side. It is configured that the engaging projection 8 is disposed in a guide groove portion 7. A contact portion between each of groove wall portions 7a and an outer peripheral surface of the engaging projection 8 serves as a contact portion P described above. FIG. 7 shows the guide groove portion 7 configured the same as the guide groove portion 7 shown in FIG. 1, but instead, the guide groove portion 7 configured as shown in FIG. 3 may be provided to the rotating body 5. In either of the configurations, the groove width of the guide groove portion 7 in a rotational direction of the rotating body 5 is designed to be approximately equal to or slightly greater than an outer diameter of the engaging projection 8. Since the other configurations are the same as those shown in FIGS. 1 and 2, the same symbols are assigned to portions that are the same as those shown in FIGS. 1 and 2, thereby omitting description thereof. Even with this configuration, the same action and effect as in the configuration shown in FIG. 1 can be obtained by the same principle as in the configuration shown in FIG. 1.

Figure 8:
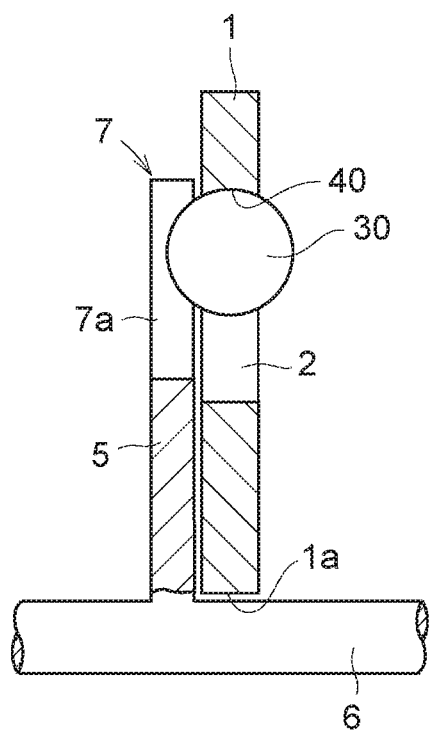
FIG. 8 is a diagram for explaining still another example of the shape of a rolling body.

FIG. 8 is a diagram for explaining still another example of the shape of a rolling body. In the example shown here, a spherical rolling body 30 is used instead of the cylindrical rolling body 3. The diameter of the rolling body 30 is designed to be greater than a thickness of an inertial body 1. An inner wall surface, on an outer side in a radial direction, of a guide hole 2 serves as a rolling surface 40 against which the rolling body 30 is pressed by a centrifugal force. The rolling surface 40 is formed in a shape that allows the rolling body 30 to be fitted thereto. It is configured that, in the state where the rolling body 30 is pressed against the rolling surface 40 by the centrifugal force, a portion, protruding to the rotating body 5 side, of the rolling body 30 is disposed in a guide groove portion 7 of the rotating body 5. A contact portion between each of groove wall portions 7a and an outer peripheral surface of the rolling body 30 serves as a contact portion P described above. FIG. 8 shows the guide groove portion 7 configured the same as the guide groove portion 7 shown in FIG. 1, but instead, the guide groove portion 7 configured as shown in FIG. 3 may be provided to the rotating body 5. In either of the configurations, the groove width of the guide groove portion 7 in a rotational direction of the rotating body 5 is designed to be approximately equal to or slightly greater than the diameter of the rolling body 30. Since the other configurations are the same as those shown in FIGS. 1 and 2, the same symbols are assigned to portions that are the same as those shown in FIGS. 1 and 2, thereby omitting description thereof.

With this configuration, even when the yaw moment is applied to the rolling body 30 due to relative rotation of the inertial body 1 and the rotating body 5, it can be suppressed that the rolling posture of the inertial body 1 is changed by that the yaw moment. That is, it can be suppressed that the rotation of the inertial body 1 is impeded by the yaw moment. Therefore, the vibration damping performance can be improved.

Figure 9:
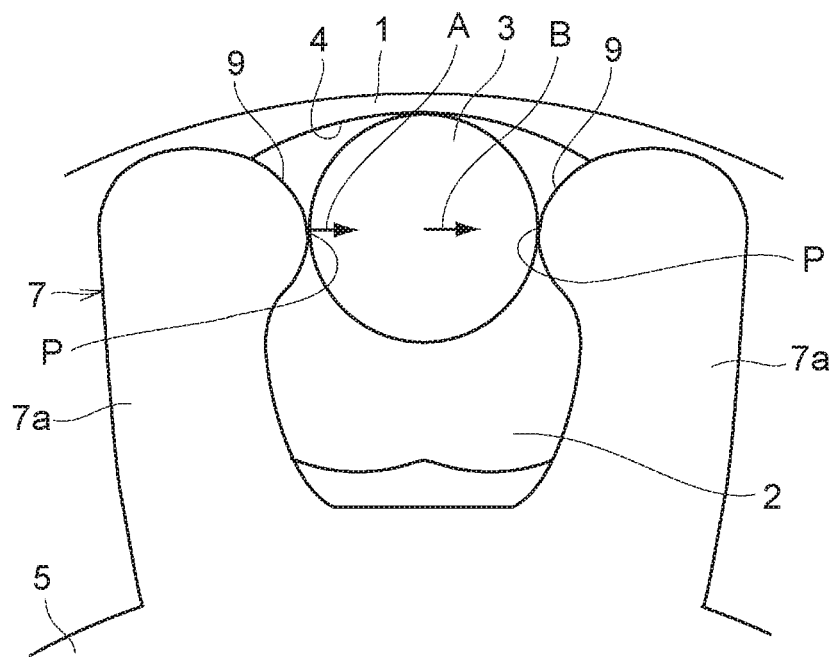
FIG. 9 is a diagram for explaining another example of a pair of groove wall portions forming a guide groove portion.

Further, herein, a description will be given of another example of a pair of groove wall portions 7a forming a guide groove portion 7. FIG. 9 shows this example. Surfaces being end portions, on an outer side in a radial direction, of the groove wall portions 7a and facing each other in a circumferential direction are each formed in a generally circular shape in section as shown in FIG. 9. That is, a curved portion 9 is formed at the end of each groove wall portion 7a. A rolling body 3 is disposed between the curved portions 9. A contact portion between each of the curved portions 9 and an outer peripheral surface of the rolling body 3 serves as a contact portion P described above. Since the other configurations are the same as those shown in FIGS. 1 and 2, the same symbols are assigned to portions that are the same as those shown in FIGS. 1 and 2, thereby omitting description thereof.

Figure 10:
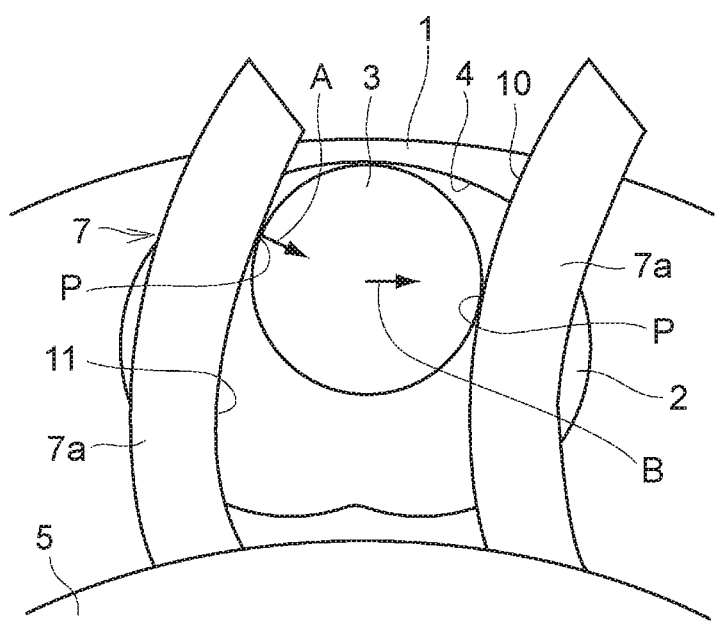
FIG. 10 is a diagram for explaining still another example of a pair of groove wall portions forming a guide groove portion.

FIG. 10 is a diagram for explaining still another example of a pair of groove wall portions 7a forming a guide groove portion 7. Each groove wall portion 7a is formed to extend outward in a radial direction of a rotating body 5 and to be curved rearward in a rotational direction of the rotating body 5. Surfaces of the groove wall portions 7a, which face each other, include a convex curved surface 10 and a concave curved surface 11. The surface of a rolling body 3 which is on the front side in the rotational direction faces the convex curved surface 10 that curves so as to be convex toward the rolling body 3. The surface of the rolling body 3 which is on the rear side in the rotational direction faces the concave curved surface 11 that curves so as to be concave toward the rolling body 3. The rolling body 3 is disposed between the convex curved surface 10 and the concave curved surface 11. A contact portion between each of the convex curved surface 10 and the concave curved surface 11 and an outer peripheral surface of the rolling body 3 serves as a contact portion P described above. Since the other configurations are the same as those shown in FIGS. 1 and 2, the same symbols are assigned to portions that are the same as those shown in FIGS. 1 and 2, thereby omitting description thereof.

With the configuration shown in FIG. 9 or FIG. 10, even when the contact portions P between the guide groove portion 7 and the rolling body 3 move in the radial direction due to torque fluctuation, it is possible to suppress or reduce a change in an angle between an action line direction A of torque transmitted from the guide groove portion 7 to the rolling body 3 at the contact portion P and a travel direction B of the rolling body 3 or a tangential direction at a contact point between a rolling surface 4 and the rolling body 3. As a result, the torque can be smoothly transmitted from a rotary shaft 6 to an inertial body 1 via the rolling body 3. Even with the configuration shown in FIG. 9 or FIG. 10, the same vibration damping performance as in the configuration shown in FIG. 1 can be obtained by the same principle as in the configuration shown in FIG. 1.

Figure 11:
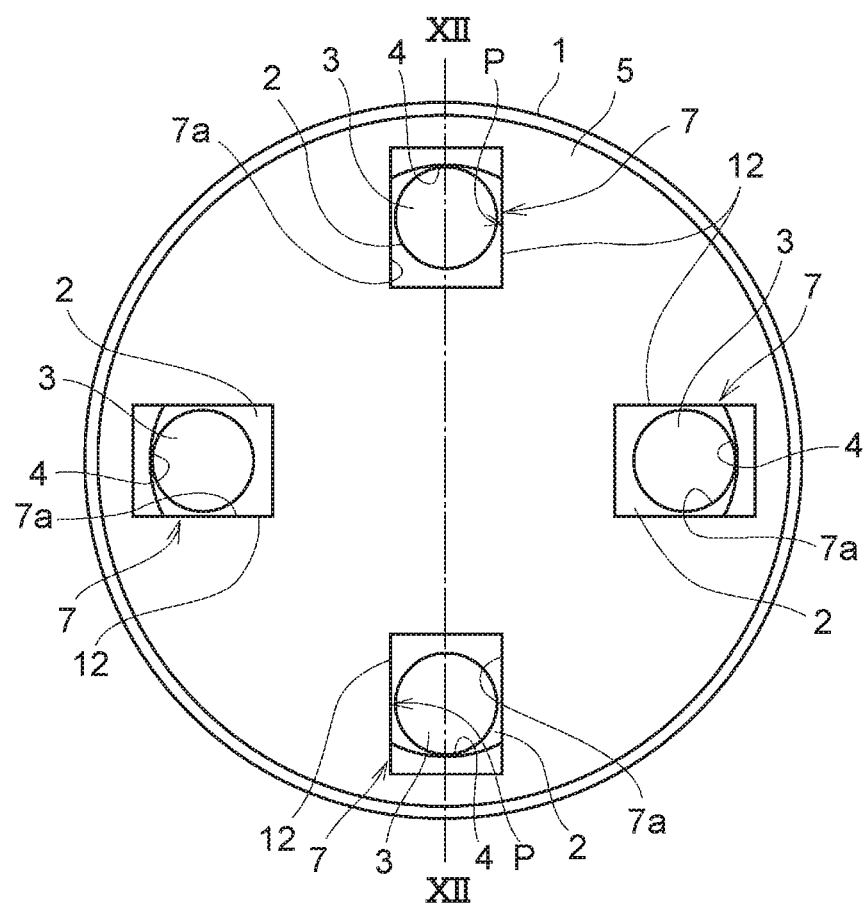
FIG. 11 is a front view exemplarily showing a second example of a torsional vibration reducing device according to an embodiment of the disclosure.
Figure 12:
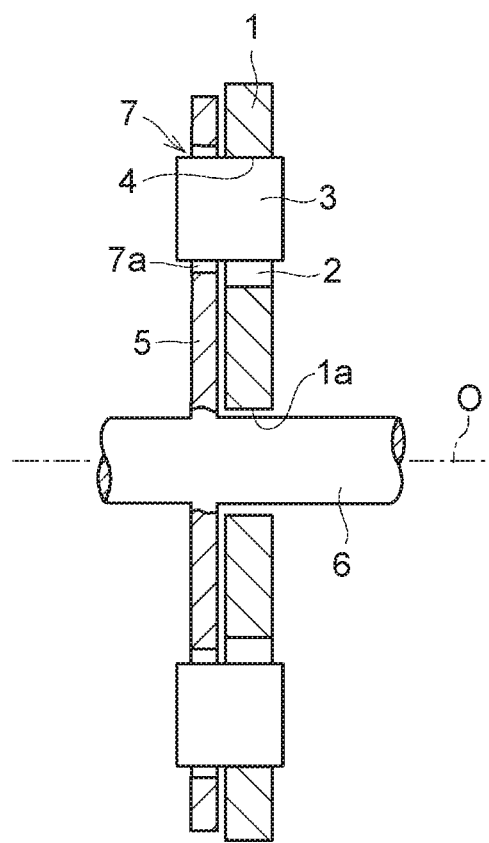
FIG. 12 is a sectional view taken along line of FIG. 11.

FIG. 11 is a front view exemplarily showing a second example of a torsional vibration reducing device according to an embodiment of the disclosure, and FIG. 12 is a sectional view taken along line XII-XII of FIG. 11. A rotating body 5 is a disk-shaped plate and has an outer diameter slightly smaller than an outer diameter of an inertial body 1. Elongated holes 12 are formed in the rotating body 5 at positions of the same radius from the rotation center O of the inertial body 1 corresponding to guide holes 2. The elongated hole 12 has a rectangular shape extending in a radial direction. The width of the elongated hole 12 in a circumferential direction is designed to be approximately equal to or slightly greater than an outer diameter of a rolling body 3. The length of the elongated hole 12 in the radial direction is designed such that the rolling body 3 is movable in the radial direction while being limited by a rolling surface 4. One axial end portion of the rolling body 3 is disposed in the elongated hole 12. That is, the elongated hole 12 serves as a guide groove portion 7 described above, while inner wall surfaces, facing each other in the circumferential direction, of the elongated hole 12 serves as groove wall portions 7a described above. A contact portion between each of the inner wall surfaces of the elongated hole 12 and an outer peripheral surface of the rolling body 3 serves as a contact portion P described above. Since the other configurations are the same as those shown in FIGS. 1 and 2, the same symbols are assigned to portions that are the same as those shown in FIGS. 1 and 2, thereby omitting description thereof.

Figure 13:
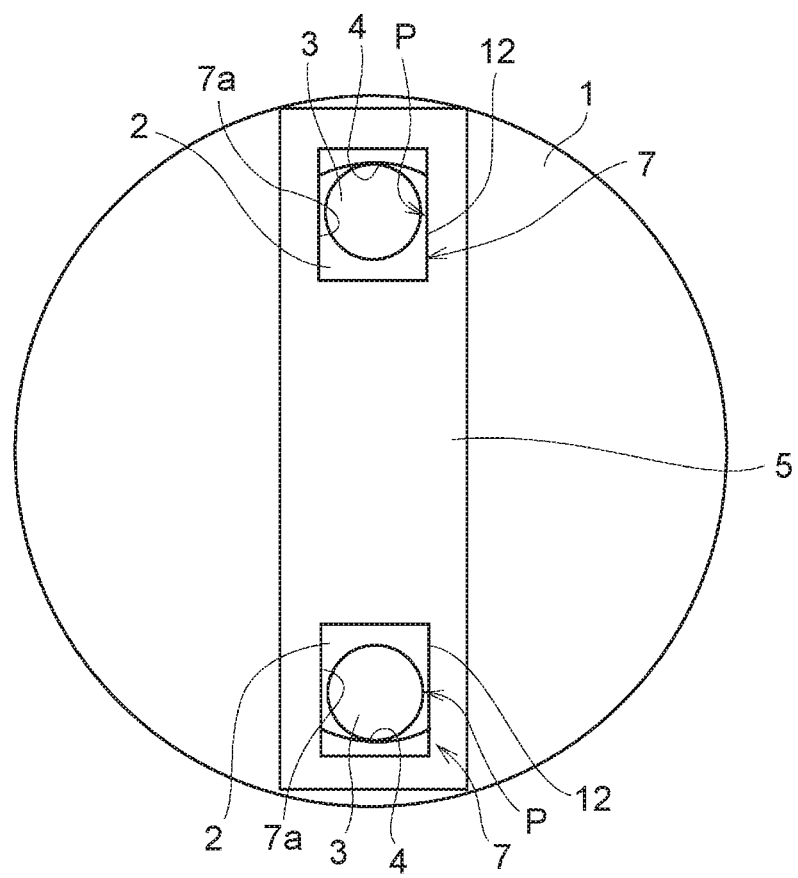
FIG. 13 is a front view exemplarily showing a third example of a torsional vibration reducing device according to an embodiment of the disclosure.

FIG. 13 is a front view exemplarily showing a third example of a torsional vibration reducing device according to an embodiment of the disclosure. In the example shown in FIG. 13, a rotating body 5 is formed in a rectangular shape extending in a radial direction, and its length is designed to be slightly smaller than an outer diameter of an inertial body 1. Elongated holes 12 are respectively formed at both ends of the rotating body 5 at positions of the same radius from the rotation center O of the inertial body 1. In the example shown in FIG. 13, two guide holes 2 are formed point-symmetrically with respect to the rotation center O of the inertial body 1, and one axial end portion of a rolling body 3 disposed in the guide hole 2 is disposed in the elongated hole 12. Since the other configurations are the same as those shown in FIGS. 1 and 2, the same symbols are assigned to portions that are the same as those shown in FIGS. 1 and 2, thereby omitting description thereof.

With the configuration shown in FIG. 11 or FIG. 13, since the elongated holes 12 are formed in the disk-shaped or rectangular rotating body 5, the configuration of the rotating body 5 can be simplified to reduce its processing and manufacturing cost. Further, with the configuration shown in FIG. 13, since at least two rolling bodies 3 are disposed point-symmetrically with respect to the rotation center O, it is possible to reduce the number of components of the device as a whole and thus to reduce the component and manufacturing cost thereof. Even with either of the configurations shown in FIGS. 11 and 13, the same action and effect as in the configuration shown in FIG. 1 can be obtained by the same principle as in the configuration shown in FIG. 1.

Figure 14:
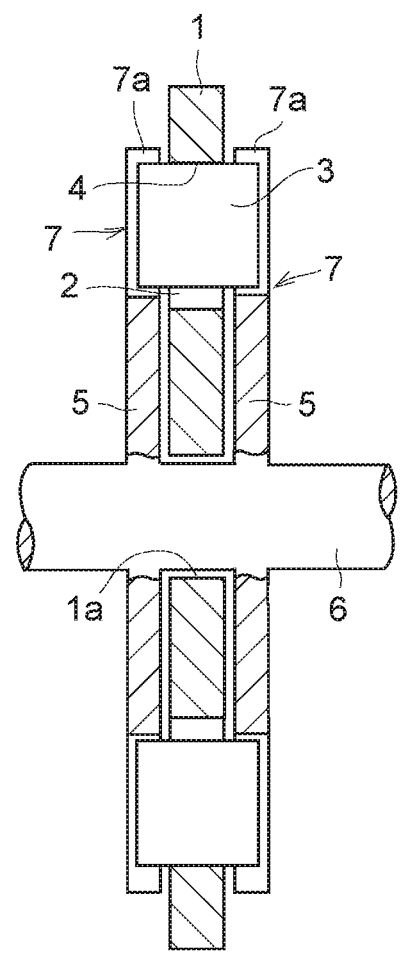
FIG. 14 shows an example in which rotating bodies are respectively disposed on both sides of an inertial body in an embodiment of the disclosure.
Figure 15:
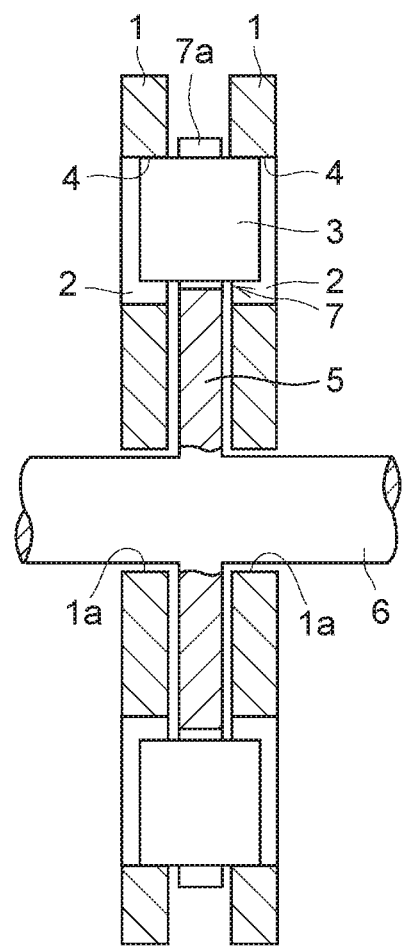
FIG. 15 shows an example in which inertial bodies are respectively disposed on both sides of a rotating body in an embodiment of the disclosure.

FIG. 14 shows an example in which rotating bodies 5 are respectively disposed on both sides of an inertial body 1 in an embodiment of the disclosure. The two rotating bodies 5 are fixed to a rotary shaft 6 so as to be integrally rotatable, and the interval between the rotating bodies 5 is designed to be slightly greater than a thickness of the inertial body 1. The inertial body 1 is disposed between the rotating bodies 5. With this configuration, the torque is input to rolling bodies 3 from their both end portions in an axial direction so that it is possible to prevent or suppress the application of a yaw moment to the rolling bodies 3. As a result, the rolling bodies 3 can stably reciprocate along rolling surfaces 4 so that relative rotation of the rotating bodies 5 and the inertial body 1 becomes better. FIG. 15 shows an example in which inertial bodies 1 are respectively disposed on both sides of a rotating body 5 in an embodiment of the disclosure. The rotating body 5 is integrally provided to a rotary shaft 6, and the inertial bodies 1 are respectively provided on both sides of the rotating body 5. With the configuration shown in FIG. 15, the torque transmitted to rolling bodies 3 is transmitted to the inertial bodies 1 from both end portions of the rolling bodies 3. Therefore, even with the configuration shown in FIG. 15, the same action and effect as in the configuration shown in FIG. 14 can be obtained.

Figure 16:
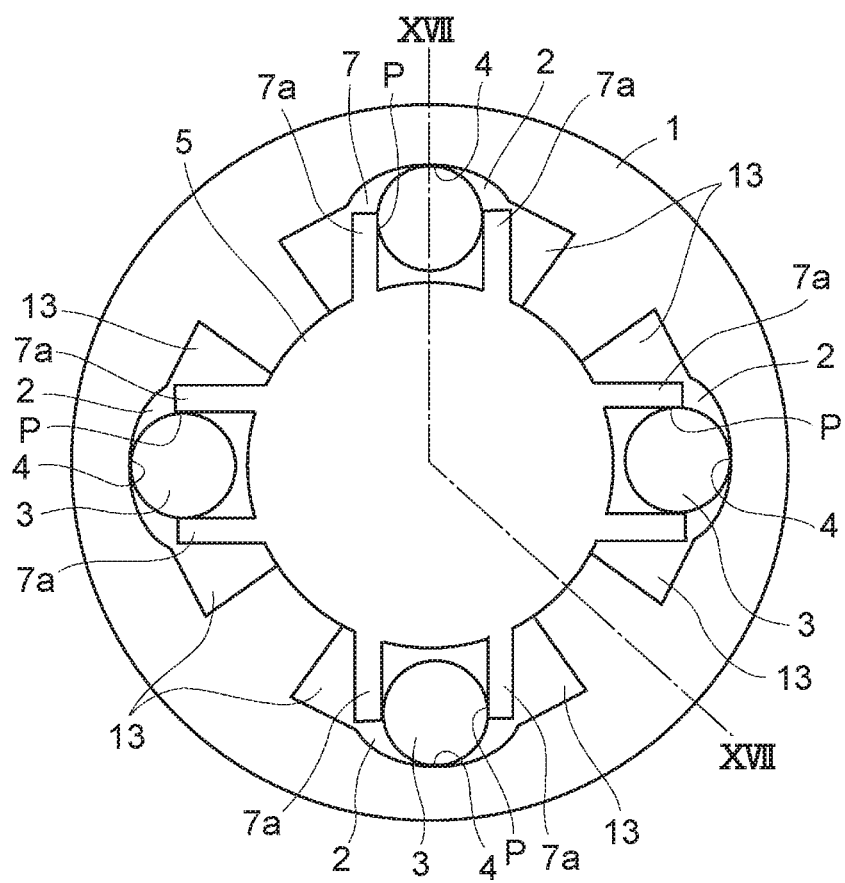
FIG. 16 is a front view exemplarily showing a fourth example of a torsional vibration reducing device according to an embodiment of the disclosure.
Figure 17:
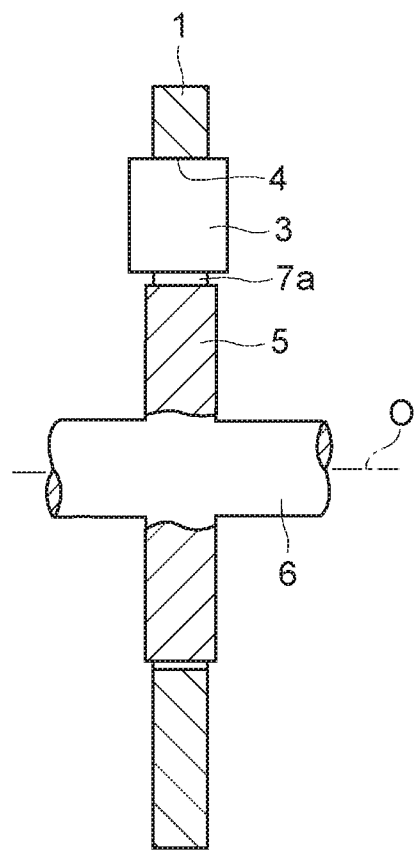
FIG. 17 is a sectional view taken along line XVII-XVII of FIG. 16.

FIG. 16 is a front view exemplarily showing a fourth example of a torsional vibration reducing device according to an embodiment of the disclosure, and FIG. 17 is a sectional view taken along line XVII-XVII of FIG. 16. In the example shown in FIGS. 16 and 17, a rotating body 5 is concentrically disposed on an inner side, in a radial direction, of an inertial body 1. Four guide holes 2 are formed in the inertial body 1 point-symmetrically with respect to the rotation center O at positions of the same radius from the rotation center O. The diameter of the rotating body 5 is designed to be smaller than a distance between points, closest to the rotation center O, on outer peripheral surfaces of two rolling bodies 3, located at positions that are point-symmetrical with respect to the rotation center O, among rolling bodies 3 being pressed against rolling surfaces 4 by a centrifugal force. Guide groove portions 7 are respectively provided at positions, corresponding to the guide holes 2, on an outer peripheral surface of the rotating body 5 so as to extend radially outward from the outer peripheral surface of the rotating body 5. The rolling body 3 is disposed between a pair of groove wall portions 7a forming the guide groove portion 7. A contact portion between each of the groove wall portions 7a and the outer peripheral surface of the rolling body 3 serves as a contact portion P described above. The pair of groove wall portions 7a and the rolling body 3 are disposed in each guide hole 2. Since the pair of groove wall portions 7a are disposed on both sides, in a circumferential direction, of the rolling body 3, the guide hole 2 is formed to be enlarged in a circumferential direction of the inertial body 1. That is, receiving portions 13 each for the corresponding groove wall portion 7a are respectively formed on both sides of the guide hole 2 in the circumferential direction. An end portion of each groove wall portion 7a extends to a radial position corresponding to a position of the center of gravity of the rolling body 3 being pressed against the rolling surface 4 by the centrifugal force. The end portion of each groove wall portion 7a may be formed with a curved portion 9 as shown in FIG. 9. Since the other configurations are the same as those shown in FIGS. 1 and 2, the same symbols are assigned to portions that are the same as those shown in FIGS. 1 and 2, thereby omitting description thereof.

With this configuration, since the inertial body 1 and the rotating body 5 can be disposed on the same plane, i.e. concentrically, the axial length of the device as a whole can be made short. As a result, the mountability can be improved. Even with the configuration shown in FIGS. 16 and 17, the same action and effect as in the configuration shown in FIG. 1 can be obtained by the same principle as in the configuration shown in FIG. 1.

Figure 18:
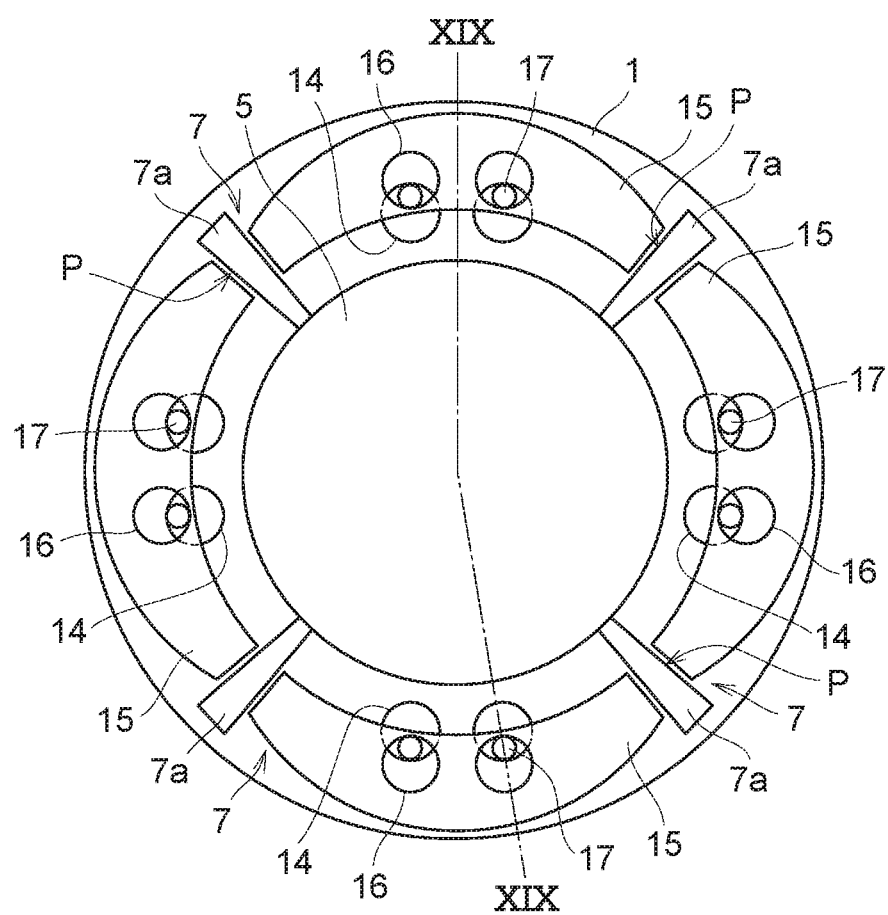
FIG. 18 is a front view exemplarily showing a fifth example of a torsional vibration reducing device according to an embodiment of the disclosure.
Figure 19:
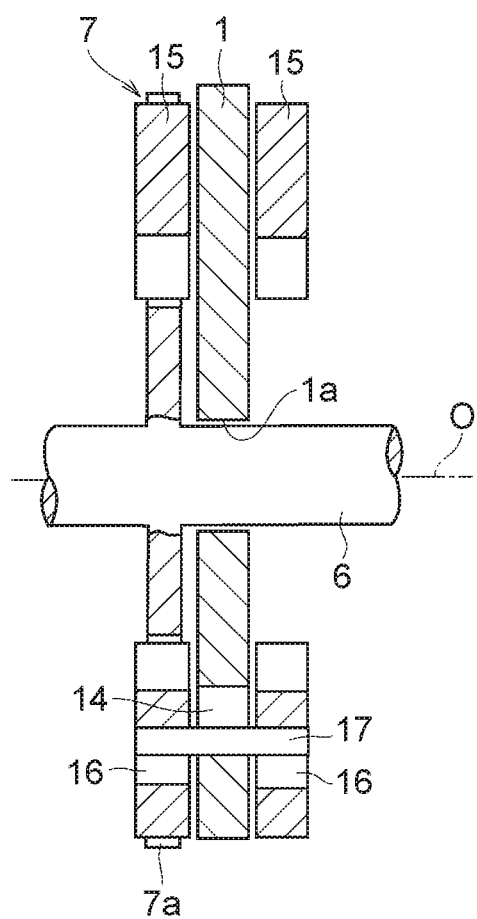
FIG. 19 is a sectional view taken along line XIX-XIX of FIG. 18.

FIG. 18 is a front view exemplarily showing a fifth example of a torsional vibration reducing device according to an embodiment of the disclosure, and FIG. 19 is a sectional view taken along line XIX-XIX of FIG. 18. An inertial body 1 is by way of example an annular plate, and a pair of first communication holes 14 passing through the inertial body 1 in a thickness direction thereof is formed at each of a plurality of portions at positions of the same radius from the rotation center O of the inertial body 1. Specifically, in the example shown here, the pairs of first communication holes 14 are formed at four portions point-symmetrically with respect to the rotation center O of the inertial body 1. Centrifugal masses 15 are disposed on both sides of the inertial body 1 at positions corresponding to the pairs of first communication holes 14. Each centrifugal mass 15 is formed in a semicircular shape extending in a circumferential direction, and second communication holes 16 corresponding to the first communication holes 14 are formed at a central portion of the centrifugal mass 15 so as to pass through the centrifugal mass 15 in a thickness direction thereof. The communication holes 14 and 16 are designed to have the same diameter. Pins 17 are each inserted into the first communication hole 14 and the second communication holes 16 formed at positions corresponding to each other in an axial direction. The centrifugal masses 15 are swingably attached to the inertial body 1 via the pins 17.

On the other hand, a rotating body 5 is integrally provided to a rotary shaft 6. The rotating body 5 is formed in a disk shape, and guide groove portions 7 are respectively provided on an outer peripheral surface of the rotating body 5 at positions corresponding to the positions where the centrifugal masses 15 are disposed. In the example shown here, four groove wall portions 7a extend radially outward from the outer peripheral surface of the rotating body 5, and the centrifugal masses 15 are respectively disposed between the groove wall portions 7a disposed at regular intervals in the circumferential direction. It is configured that end portions of the centrifugal masses 15 in the circumferential direction respectively contact the groove wall portions 7a. Contact portions therebetween each serve as a contact portion P described above. The first communication hole 14 corresponds to a second hole portion of the disclosure, while the second communication hole 16 corresponds to a first hole portion of the disclosure. Further, the centrifugal mass 15, the second communication hole 16, and the pin 17 correspond to a coupling member of the disclosure.

The operation of the torsional vibration reducing device configured as described above will be described. Since the centrifugal masses 15 are coupled to the rotating body 5 via the guide groove portions 7, the centrifugal masses 15 rotate together with the rotating body 5 so that a centrifugal force is applied to the centrifugal masses 15. When the centrifugal force is large enough, the centrifugal masses 15 move radially outward. The pins 17 are pressed against inner wall surfaces, on an inner side in the radial direction, of the second communication holes 16 and against inner wall surfaces, on an outer side in the radial direction, of the first communication holes 14. When the torque does not fluctuate or fluctuates only slightly in this state, the entire torsional vibration reducing device configured as described above rotates as one unit.

On the other hand, when the torque fluctuates, vibration occurs in the rotation of the rotating body 5 so that vibration occurs in the rotation of the centrifugal masses 15. Then, the centrifugal masses 15 and the inertial body 1 rotate relative to each other by a predetermined angle. Since the communication holes 11 and 16 are each a curved surface with a small curvature, the positions of the centrifugal masses 15 in the radial direction of the rotating body 5 change due to such relative rotation. As a result, the contact portions P between the guide groove portions 7 and the centrifugal masses 15 move in the radial direction of the rotating body 5. That is, the portions where the inertia torque of the inertial body 1 is applied to the rotating body 5 change in the radial direction of the rotating body 5. Such a change repeatedly occurs due to torque fluctuation. Accordingly, it is possible to effectively suppress torque fluctuation and torsional vibration due to the torque fluctuation. Further, with this configuration, it is possible to increase the mass of the inertial body 1 of the device as a whole so that the vibration damping performance can be further improved.

Figure 20:
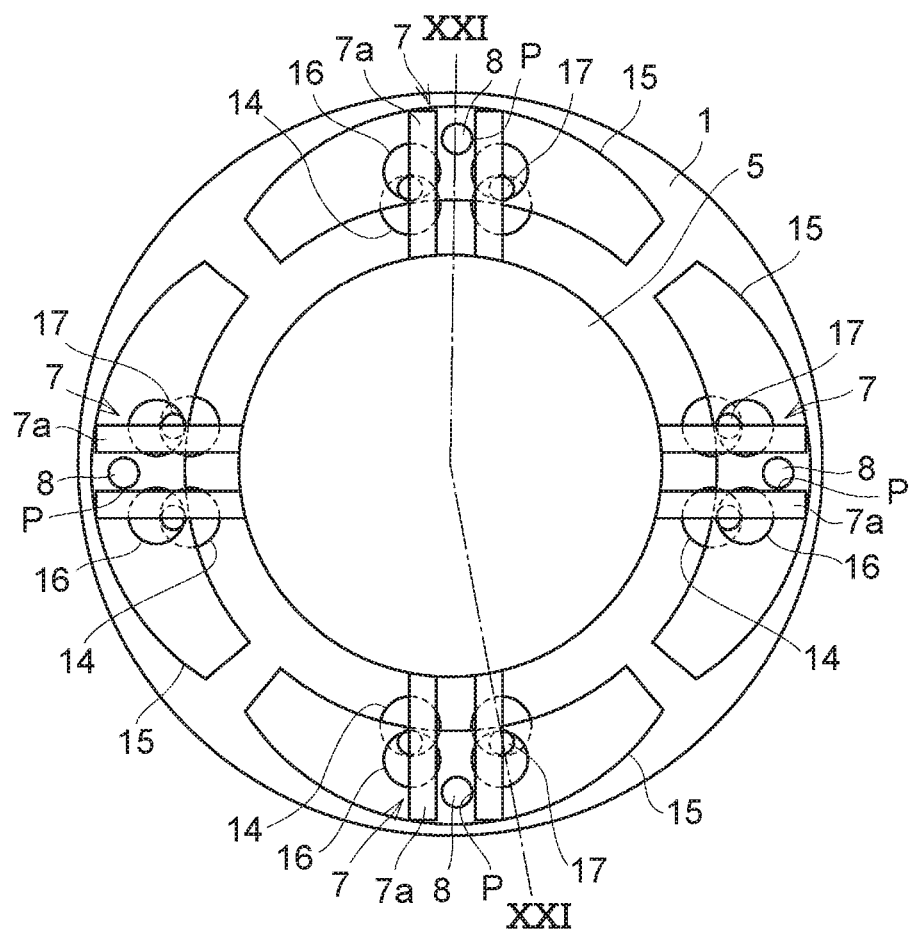
FIG. 20 is a front view exemplarily showing another example of the torsional vibration reducing device shown in FIG. 18.
Figure 21:
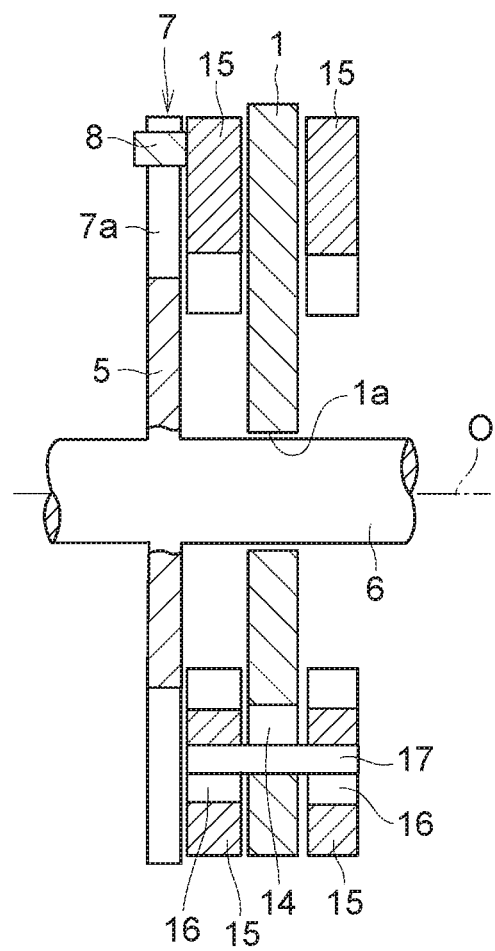
FIG. 21 is a sectional view taken along line XXI-XXI of FIG. 20.

FIG. 20 is a front view exemplarily showing another example of the torsional vibration reducing device shown in FIG. 18, and FIG. 21 is a sectional view taken along line XXI-XXI of FIG. 20. In the example shown here, centrifugal masses 15 disposed on the rotating body 5 side are each provided with an engaging projection 8, and the engaging projection 8 is disposed in each of guide groove portions 7. A contact portion between each of groove wall portions 7a and an outer peripheral surface of the engaging projection 8 serves as a contact portion P described above. FIG. 20 shows the guide groove portion 7 configured the same as the guide groove portion 7 shown in FIG. 1, but instead, the guide groove portion 7 configured as shown in FIG. 3 may be provided to the rotating body 5. In either of the configurations, the groove width of the guide groove portion 7 in a rotational direction of the rotating body 5 is designed to be approximately equal to or slightly greater than an outer diameter of the engaging projection 8. Even with the configuration shown in FIGS. 20 and 21, the same action and effect as in the configuration shown in FIG. 1 or FIG. 18 can be obtained by the same principle as in the configuration shown in FIG. 1.

Figure 22:
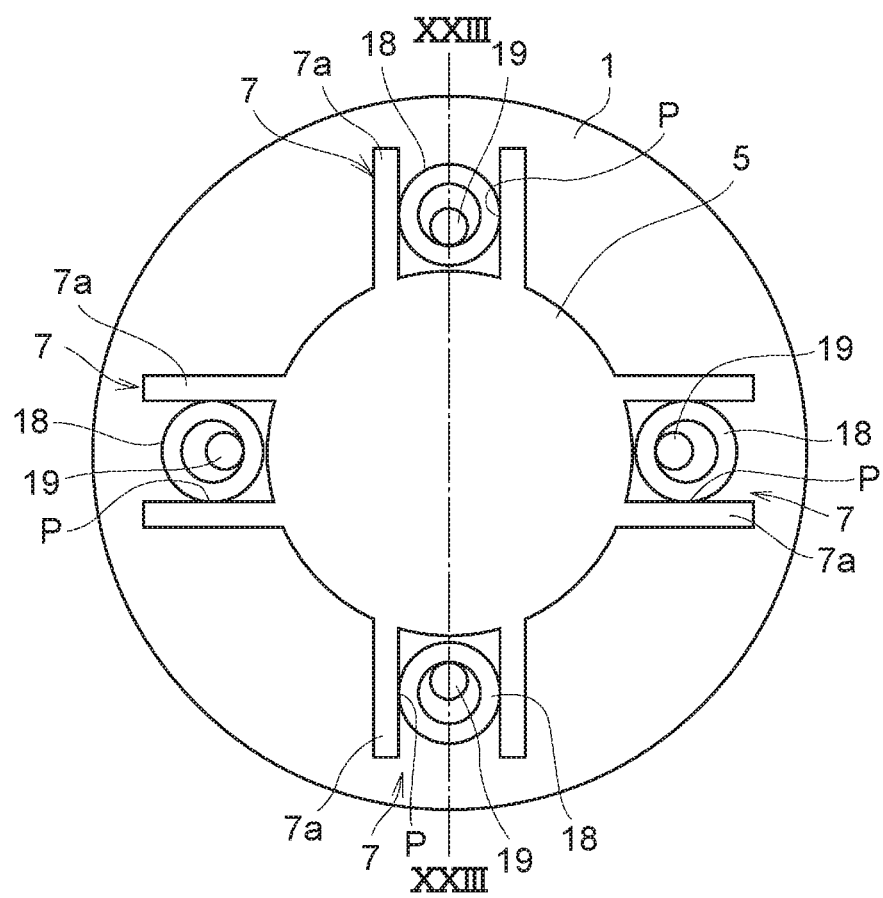
FIG. 22 is a front view exemplarily showing a sixth example of a torsional vibration reducing device according to an embodiment of the disclosure.
Figure 23:
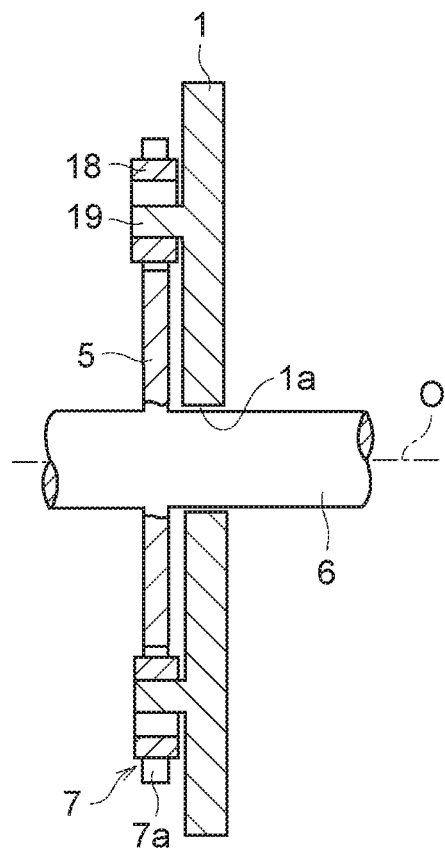
FIG. 23 is a sectional view taken along line of FIG. 22.

FIG. 22 is a front view exemplarily showing a sixth example of a torsional vibration reducing device according to an embodiment of the disclosure, and FIG. 23 is a sectional view taken along line of FIG. 22. In the example shown here, a coupling member of the disclosure is constituted by a ring 18. An inertial body 1 is an annular plate, and four projections 19 are formed point-symmetrically with respect to the rotation center O at positions of the same radius from the rotation center O on the inertial body 1 and extend to the rotating body 5 side. The rings 18 are respectively disposed at positions corresponding to the projections 19, and the projections 19 are respectively inserted into the rings 18. Specifically, it is configured that an outer peripheral surface of the projection 19 contacts an inner wall surface, on an inner side in a radial direction of the inertial body 1, of the ring 18. The ring 18 is disposed in each of guide groove portions 7 of the rotating body 5. A contact portion between each of groove wall portions 7a and an outer peripheral surface of the ring 18 serves as a contact portion P described above. Since the other configurations are the same as those shown in FIGS. 1 and 2, the same symbols are assigned to portions that are the same as those shown in FIGS. 1 and 2, thereby omitting description thereof. The ring 18 corresponds to a hollow member of the disclosure, while the projection 19 corresponds to a support pin of the disclosure.

With the configuration shown in FIGS. 22 and 23, since the rings 18 are coupled to the rotating body 5 via the guide groove portions 7, the rings 18 rotate together with the rotating body 5. Since the projections 19 are in engagement with the inner wall surfaces of the rings 18, when the torque does not fluctuate or fluctuates only slightly, the entire device rotates as one unit. When the torque fluctuates in this state, the rings 18 and the inertial body 1 rotate relative to each other by a predetermined angle. Since the inner wall surfaces of the rings 18 are each a curved surface with a small curvature radius, contact portions P between the inner wall surfaces of the rings 18 and the outer peripheral surfaces of the projections 19 move in the radial direction. Accordingly, the portions where the inertia torque of the inertial body 1 is applied to the rotating body 5 change in the radial direction. Such a change repeatedly occurs due to torque fluctuation. Consequently, it is possible to effectively suppress torque fluctuation and torsional vibration due to the torque fluctuation. Further, with this configuration, since no guide hole 2 is provided to the inertial body 1, the mass of the inertial body 1 can be increased compared to the configuration shown in FIG. 1 or FIG. 3. Since the inertia torque of the inertial body 1 can be increased accordingly, the vibration damping performance can be further improved.

Figure 24:
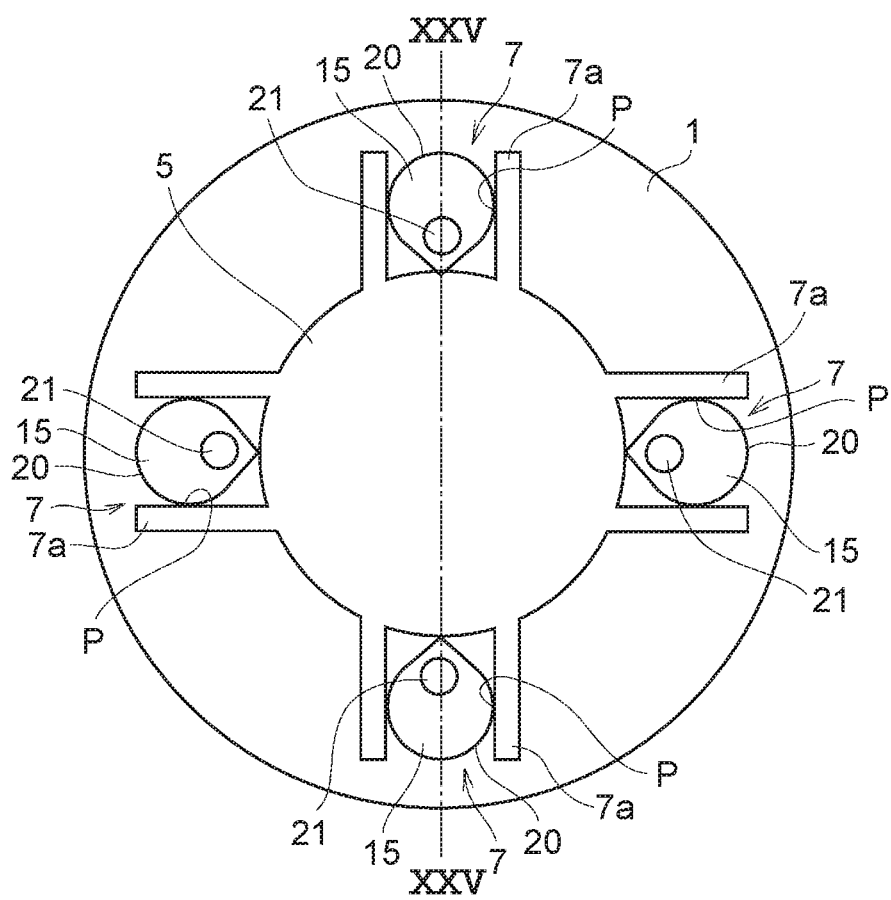
FIG. 24 is a front view exemplarily showing a seventh example of a torsional vibration reducing device according to an embodiment of the disclosure.
Figure 25:
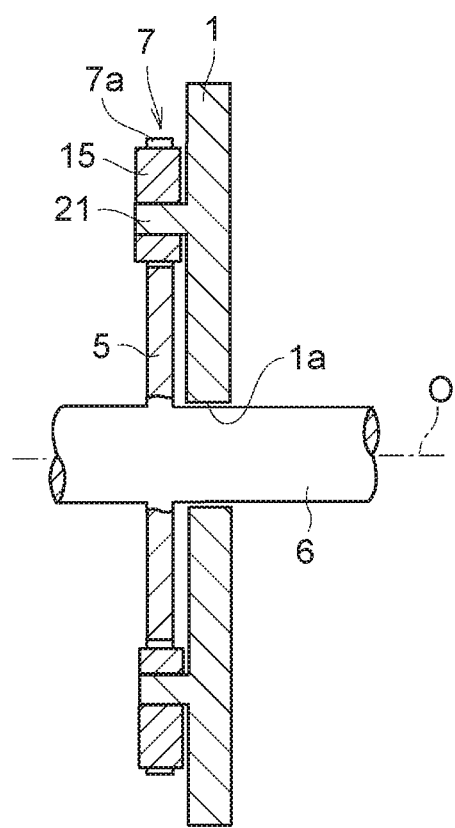
FIG. 25 is a sectional view taken along line XXV-XXV of FIG. 24.

FIG. 24 is a front view exemplarily showing a seventh example of a torsional vibration reducing device according to an embodiment of the disclosure, and FIG. 25 is a sectional view taken along line XXV-XXV of FIG. 24. In the example shown here, centrifugal masses 15 are attached so as to be swingable with respect to an inertial body 1. In the example shown in FIGS. 24 and 25, each centrifugal mass 15 is, by way of example, formed in a fan shape, and it is configured that a fan-shaped portion, i.e. a portion formed as a curved surface 20, of an outer peripheral surface of each centrifugal mass 15 contacts a corresponding one of guide groove portions 7. Contact portions therebetween each serve as a contact portion P described above. A hole is formed in each centrifugal mass 15 at a portion offset from the center of curvature of the curved surface 20, and a corresponding one of coupling pins 21 integrally formed with the inertial body 1 is rotatably fitted into the hole. Accordingly, the centrifugal mass 15 swings about the fitting portion with the coupling pin 21 as the rotation center. The coupling pin 21 may be integrally formed with the centrifugal mass 15 and may be rotatably fitted to the inertial body 1. The coupling pin 21 corresponds to a second coupling portion of the disclosure.

With the configuration shown in FIGS. 24 and 25 since the centrifugal masses 15 are coupled to a rotating body 5 via the guide groove portions 7, the centrifugal masses 15 rotate together with the rotating body 5. The inertial body 1 is coupled to the rotating body 5 via the centrifugal masses 15. When the torque input to the rotating body 5 does not fluctuate or fluctuates only slightly, the entire device rotates as one unit. When a centrifugal force applied to the centrifugal masses 15 is large enough, inner peripheral surfaces, on an inner side in a radial direction of the rotating body 5, of the holes are pressed against outer peripheral surfaces, on an inner side in the radial direction, of the coupling pins 21 with the load according to the centrifugal force. When the torque fluctuates in this state, vibration occurs in the rotation of the rotating body 5 so that the rotating body 5 and the inertial body 1 rotate relative to each other by a predetermined angle. That is, the centrifugal masses 15 each swing about the coupling pin 21. As a result, the contact portions P between the guide groove portions 7 and the curved surfaces 20 of the centrifugal masses 15 move in the radial direction. Accordingly, the portions where the inertia torque of the inertial body 1 is applied to the rotating body 5 change in the radial direction. Such a change repeatedly occurs due to torque fluctuation. Consequently, it is possible to effectively suppress torque fluctuation and torsional vibration due to the torque fluctuation. Further, with the configuration shown in FIGS. 24 and 25, since no guide hole 2 is provided, the mass of the inertial body 1 can be increased accordingly compared to the configuration shown in FIG. 1 or FIG. 3. Since the inertia torque of the inertial body 1 can be increased, it is possible to improve the vibration damping performance.

In any of the configurations described above, the member directly attached to or engaged with the rotating body 5 is a coupling member, and the inertial body 1 is disposed adjacent to the rotating body 5. Therefore, the arrangement and size of the inertial body 1 are not restricted by the size, shape, and so on of the rotating body 5. As a result, it is possible to increase the mass of the inertial body 1 to improve the vibration damping performance without increasing the size of the rotating body 5. It is also possible to prevent or suppress an increase in the size of the device. While the disclosure has been described with reference to the plurality of embodiments, the disclosure is not limited thereto. For example, the inertial body 1 may be divided into a plurality of pieces, and the guide hole 2 may be formed in each divided piece.

What is claimed is:

1. A torsional vibration reducing device comprising:
    a rotating body configured to rotate when torque is input to the rotating body, the rotating body being coupled to a drive power source via a rotary shaft;
    an inertial body configured to rotate relative to the rotating body so as to suppress torsional vibration of the rotating body when the torque fluctuates;
    a coupling member configured to transmit the torque to the rotating body and to the inertial body;
    a first coupling portion provided to one of the rotating body and the inertial body, the first coupling portion engaging with the coupling member such that the first coupling portion restricts movement of the coupling member in a rotational direction of the rotating body and allows movement of the coupling member in a radial direction of the rotating body; and
    a second coupling portion provided to another one of the rotating body and the inertial body, the second coupling portion engaging with the coupling member such that when the rotating body and the inertial body rotate relative to each other, a contact portion of the coupling member with respect to the first coupling portion moves in the radial direction of the rotating body,
    wherein the rotating body is concentrically disposed on an inner side, in a radial direction, of the inertial body,
    the coupling member is configured to move in a reciprocating motion or a pendulum motion,
    the coupling member includes a member that has a circular shape in cross section, and is disposed in parallel to a rotation center axis of the rotating body, and
    the second coupling portion includes a circular arc surface, the member receives a centrifugal force so as to be pressed against the circular arc surface when the rotating body rotates, the circular arc surface having a curvature radius that is smaller than a curvature radius of an outer shape of the inertial body, the curvature radius of the circular arc surface centering at a portion that is offset from a rotation center of the inertial body.

2. The torsional vibration reducing device according to claim 1, wherein
    the first coupling portion extends in the radial direction of the rotating body, and
    the first coupling portion includes a guide groove portion, the guide groove portion sandwiches the coupling member so as to guide the coupling member in the radial direction of the rotating body.

3. The torsional vibration reducing device according to claim 2, wherein
    the coupling member includes a centrifugal mass that is guided by the guide groove portion in the radial direction of the rotating body, at least a pair of first hole portions that are disposed in the centrifugal mass side by side in a circumferential direction of the rotating body, and pins that are disposed in the first hole portions, and configured to move in the first hole portions, and
    the second coupling portion includes second hole portions, the pins are disposed in the second hole portions.

4. The torsional vibration reducing device according to claim 2, wherein
    the coupling member includes a hollow member of an annular shape in cross section, the hollow member is guided by the guide groove portion in the radial direction of the rotating body, and
    the second coupling portion includes a support pin having an outer diameter smaller than an inner diameter of the hollow member and being disposed in the hollow member.

5. The torsional vibration reducing device according to claim 2, wherein
    a surface, that contacts the guide groove portion, of the coupling member is a curved surface,
    the coupling member is a swing body that rotates about a portion offset from a center of curvature of the curved surface, and
    the second coupling portion includes a coupling pin that is fitted to the swing body so as to rotate at a rotation center of the swing body.

* * * * *